United States Patent [19]

Dehne

[11] Patent Number: 4,998,860
[45] Date of Patent: Mar. 12, 1991

[54] CONVEYOR APPARATUS

[75] Inventor: Wilfried E. Dehne, Rockford, Ill.

[73] Assignee: Fibro, Inc., Rockford, Ill.

[21] Appl. No.: 209,740

[22] Filed: Jun. 22, 1988

[51] Int. Cl.$^5$ .............................................. B65G 65/00
[52] U.S. Cl. ........................................ 414/750; 74/29
[58] Field of Search ...................... 414/749, 750, 222; 74/29-32; 104/243, 264, 287, 288; 198/468.01, 468.06, 468.9, 750

[56] References Cited

U.S. PATENT DOCUMENTS

| | | | |
|---|---|---|---|
| 1,061,753 | 5/1913 | Kirchhoff | 74/30 |
| 3,357,271 | 12/1967 | Nirenberg | 74/31 |
| 3,765,251 | 10/1973 | Whitenack, Jr. | 74/29 |
| 4,032,018 | 6/1977 | Wallis | 198/750 X |
| 4,244,233 | 1/1981 | Brans | 74/29 X |
| 4,477,275 | 10/1984 | Pauluk et al. | 414/222 X |

FOREIGN PATENT DOCUMENTS 3622665  1/1988  France .

Primary Examiner—Robert J. Spar
Assistant Examiner—William M. Hienz
Attorney, Agent, or Firm—Townsend and Townsend

[57] ABSTRACT

A drive mechanism which is suitable for long strokes of motion (4 feet to over 100 feet) and is capable of carrying heavy loads (500 pounds to over 20,000 pounds) at very high speeds (over 5 feet per second) operates without substantial use of electronics or hydraulics. To produce these desirable characteristics a special index drive unit has two separate output drive gears (43, 45) which are driven by the same motor. The first output drive gear engages a first rack to produce rapid acceleration. The second output drive gear which is directly connected to the input drive shaft from the motor to the index drive unit then engages a second rack to produce high velocity movement. At the end of the desired movement the first gear engages a further rack to produce rapid deceleration of the load carrier of the drive mechanism.

16 Claims, 9 Drawing Sheets

PRIOR ART

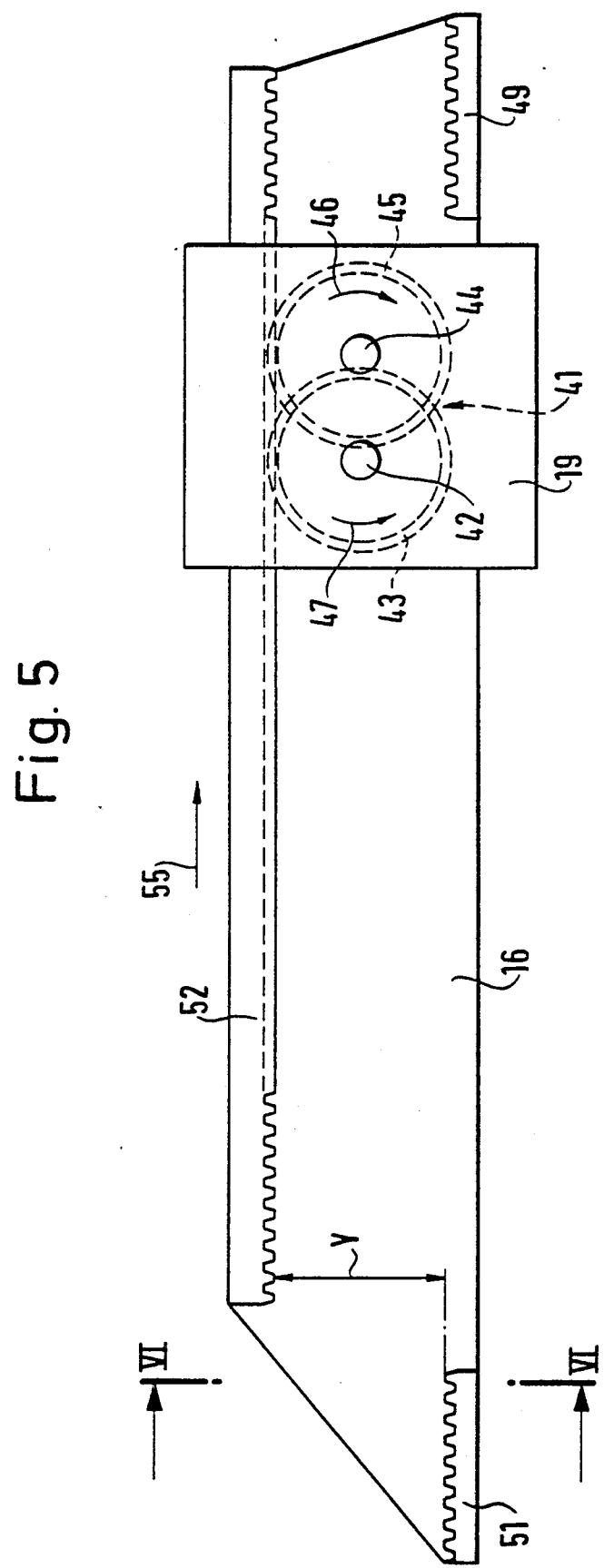

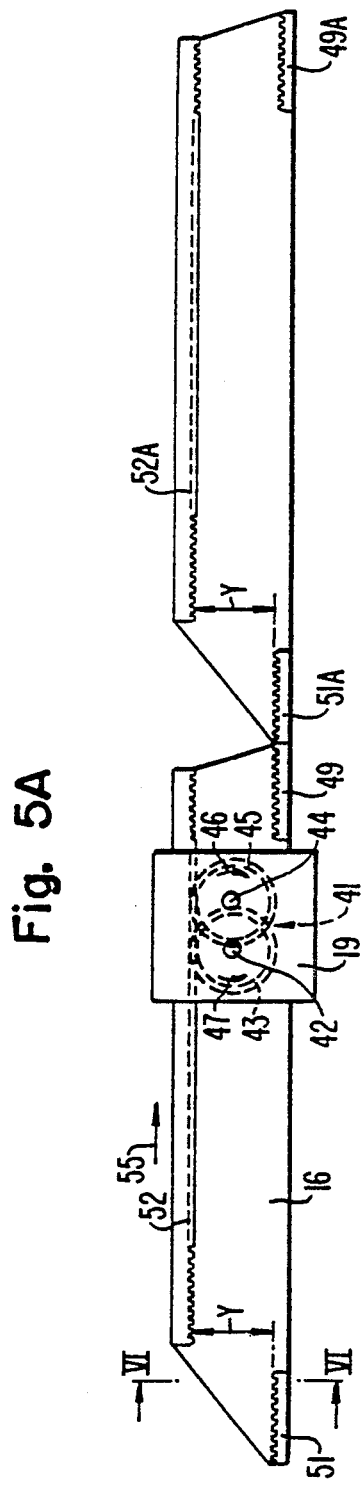

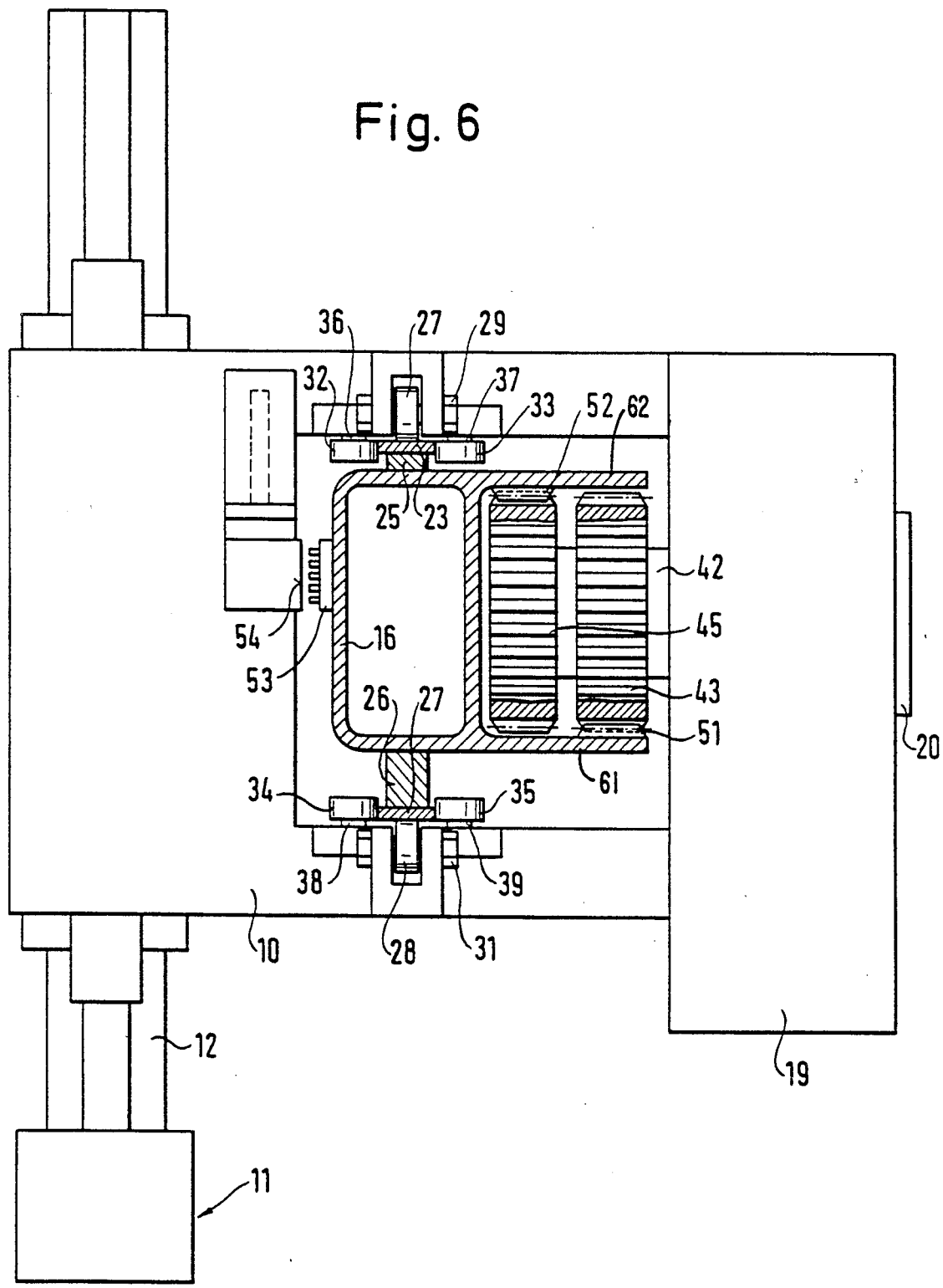

CONVEYOR APPARATUS

The present invention relates to drive mechanisms and has particular reference to drive mechanisms suitable for moving relatively heavy loads from a start position to a stop position over relatively long strokes of motion at relatively high speed.

Such drive mechanisms would typically be used as a shuttle unit, as a machine loader for line to line transfer and as a drive mechanism for rotary indexing, e.g. for a rotary table rotatable between several working stations.

It is known in the industry that for speed in excess of about 5 feet per second, for travel over strokes in excess of about 6 feet and for loads of over 1000 pounds the choice of a reliable, high cycling mechanism is limited, particularly when high accuracy and predictable life are required. High accuracy in this context means accuracy less than ±1 mm with ±0.1 mm possible. Predictable life means only rolling contact, no sliding contact, and that no wear components, such as brakes, clutches, shock absorbers etc. are used.

Some of the known mechanisms which have been used to date are:

(a) electronic closed loop or limit switch controlled open loop, servo-driven, rack and pinion, linkage or ball screw systems,
(b) hydraulic mechanism and hydrostatically driven rack and pinion, ball screw or linkage systems, and
(c) hypercycloidal mechanisms.

All these available mechanisms are however relatively expensive and at least the alternatives (a) and (b) are regarded as undesirable by many potential users due to their technological complexity.

For accelerating loads over relatively short strokes and subsequently decelerating them again, extensive use is made of drive units referred to as index drive units or cam operated index drives. Such index drive units have a constant speed input shaft, drivable by a constant speed motor, and a variable speed output shaft. They may for example be used to move a rotatable table from one working station to the next with the table being accelerated in the first part of the movement and decelerated during the last part of the movement. Such index drive units produce a substantially sinusoidal acceleration and subsequent deceleration of the output shaft and thus of the load and are regarded as very reliable and energy efficient. They have the further advantage that they are available from a number of manufacturers at a reasonably competitive price. Unfortunately such index drive units are not inherently suited, as a result of their internal design, for producing movement of loads over long strokes with rapid acceleration and deceleration at the start and end of each stroke respectively.

It is accordingly the principal object of the present invention to a provide a relatively inexpensive drive mechanism capable of moving heavy loads over relatively long strokes of motion at relatively high speed, with relatively high positional accuracy for millions of cycles, without the extensive use of electronics or hydraulics. Typical examples of suitable applications would be the use of the apparatus to carry loads in the range 500 pounds to over 50,000 pounds, over strokes of motion in the range from 4 feet to over 100 feet, and at speeds in excess of 5 feet per second, every 10 to 30 seconds with relatively high positional accuracy for millions of cycles, and with no preventative maintenance.

It is a further object of the present invention to provide drive mechanisms which are suitable for multiple stops and variable strokes of motion in increments, with the mechanism being robust and having a long working life in terms of operating cycles.

Furthermore, it is the object of the present invention to satisfy these aims utilising components which are all within the scope of currently available technology.

In order to satisfy these objects the drive mechanism of the present invention comprises a load mover for connection to a payload for moving the same; elongate track means extending in a direction in which said load mover is movable; a drive motor for driving said load mover and a gear system connectable to said drive motor; wherein said load mover is fixedly connected to one of said gear system and said track means for movement between a start position and a stop position; wherein said elongate track means comprises first and second tracks extending in series in said direction; wherein said gear system comprises a first rotatable output drive engageable with said first track and connected in operation to said drive motor via an index drive unit forming a first transmission, and a second rotatable output drive engageable with said second track and connected in operation with said drive motor via a second transmission; wherein said first track is positioned relative to said second track so that when said first output drive leaves said first track said second output drive is engaged said second track and wherein said first output drive has, on leaving said first track, a peripheral speed at least substantially equal to the peripheral speed of said second output drive engaged with said second track.

The present invention thus utilises a first output drive engageable with a first track and driven by a drive motor via an index drive unit or cam operated index drive to produce rapid acceleration of a load mover supporting the load in question. As soon as the acceleration phase is complete the first output drive leaves the first track and the load mover and payload are moved at substantially constant velocity by engagement of the second output drive with the second track, with the second output drive being driven from the same drive motor as is used to drive the cam operated index drive. This is readily possible since the drive motor is no longer required to accelerate the load but instead merely has to provide sufficient drive power to overcome friction and air resistance.

In its broadest aspect the output drives could comprise wheels, for example rubber tired wheels or solid railroad-type wheels running along suitable tracks or rails.

Such an arrangement could for example be used in an apparatus in which the track means comprises linear track means and wherein the load mover is connected to the gear system and is movable therewith along the track means with the track means remaining stationary.

An arrangement of this kind equipped with rolling wheels, would be particularly inexpensive to construct and the items which are principally subject to wear, predominantly the wheels which engage the first track for accelerating the load and which are thus most likely to suffer damage through slippage, could be made readily interchangeable.

However, in the interest of avoiding slippage and obtaining precisely defined strokes of motion and stopping and starting positions, the drive mechanism of the invention will normally use a first track in the form of a first rack with the first output drive comprising a first output drive gear capable of meshing with the first rack.

Furthermore, the second track will normally comprise a second rack and the second output drive will in turn comprise a second output drive gear capable of meshing with said second rack.

It is important to realise that the preferred embodiment in which the first and second tracks are racks is only feasible because of a special feature of the commercially available index drive units; namely, that the angular position of the output drive shaft always has an accurately defined angular position relative to the angular position of the input shaft. Thus, providing the first and second racks are correctly positioned relative to one another, the disconnection of the first output drive from the first rack and the engagement of the second output drive with the second rack can always be substantially smoothly effected without any undesirable jolt or discontinuity in the velocity curve for the load.

As soon as the acceleration phase is complete the second output drive or constant velocity drive gear will also engage the second or constant velocity rack which is mechanically connected to the first acceleration rack.

After the constant velocity gear is fully engaged the acceleration gear leaves the acceleration gear rack. This all takes place during the short constant velocity portion of the index drive.

Because of residual vibration at the end of acceleration, there must be a short period of constant velocity which means zero acceleration. Only during that zero acceleration, near zero force, would one dare to mesh gears with the constant velocity gear and rack.

Having accelerated the load mover and load it will generally be necessary to decelerate the same so that the load mover and load are stationary at the stop position. Such deceleration could be achieved by inbuilt brakes or damped buffers such as are used at the ends of railway lines. However, such brakes and buffers add additional complication, weight and stress to the system and are energy-inefficient. It must be born in mind that the drive mechanisms of interest here may be called upon to execute say 3 to 10 cycles per minute. This is 360 per hour, 3 million per year or 30 million in ten years. No brake, buffer, etc. will be able to do that and hold accuracy.

To overcome these disadvantages the present invention prefers an arrangement wherein a third rack constructed in accordance with said first rack is provided at an end of said second rack remote from said first rack and is engageable by said first output drive during stopping of the load mover, with said third rack being positioned relative to said second rack so that it is engaged by said first output drive gear when said second output drive gear leaves said second rack.

Using this system the braking effort that is required is supplied by the deceleration phase of the output shaft of the index drive unit and the braking is achieved in a relatively short distance by engagement of the first output drive gear with the third track. The braking effort itself is assisted by the transmission present between the drive motor and the first output gear. Moreover, when using an electric motor for the motor drive means, the motor can be used as a generator during braking, leading to a recovery of energy.

For multiple stops the third rack is preferably followed by further first, second and third racks defining at least one further start position coincident with said stop position, and a further stop position spaced from said further start position. Such an arrangement is of great advantage with gantry systems which are required to serve a number of adjacent loading bays. With such an arrangement first and third racks would be arranged at each of said bays permitting stopping and starting of the gantry at each bay for loading/unloading purposes.

In such an arrangement each further first rack will simply form an extension of the immediately preceding third rack, so that the first output drive gear does not need to be disengaged from the one rack and reengaged with the next at the transition between the two racks, but instead rolls smoothly from one rack onto the next.

Since most apparatus utilising the drive mechanism of the invention will be required to run in both directions the third racks will act as first racks for movement in the reverse direction.

In a particularly preferred practical embodiment of the drive mechanism of the present invention the second rack extends parallel to the first rack and is spaced therefrom by a vertical spacing and by a horizontal spacing, i.e. by respective spacings in two planes at right angles to one another. In such an arrangement the second transmission preferably comprises an extension of the input drive shaft connecting said motor drive means to said index drive unit. The first and second output drive gears are then spaced axially from one another by an amount corresponding to said horizontal spacing of said first and second racks.

An arrangement of this kind is particularly favoured since it results in a very simple design for the first and second transmissions. Because of this arrangement the first and second output drive gears will rotate in different directions and the vertical spacing of the first and second racks makes it possible for the second rack to engage with the second output drive gear above this gear and for the first rack to engage below the first output drive gear, so that despite the different directions of rotation both gears produce movement of the load mover in the same direction.

In a preferred realisation of this drive mechanism the first and second output drive gears have a diameter corresponding substantially to said vertical spacing so that the gear system can be neatly accommodated in the vertical spacing between the first and second racks. Moreover, the vertical spacing of the first and second racks means that they can be mounted on respective flanges of a suitable girder. E.g. a C-section or I-beam girder can be used which forms a stable support for the load mover.

The first, second and third racks could however also be arranged alongside one another providing the second output drive gear is geared to the input drive shaft so that it rotates in the same direction as the first output drive gear.

With the arrangements described above the cam operated index drive and the first, second and third racks are arranged to produce acceleration of said load mover on said first rack, constant velocity of said load mover on said second rack and deceleration of said load mover on said third rack. Acceleration and deceleration of the load mover are thus at least primarily completed on the first rack and on the third rack, respectively. The final portion of the acceleration phase and the initial portion of the deceleration phase could however also take place at the start and end of the second rack, respectively.

The present apparatus is however in no way limited to linear arrangements. By way of example the first, second and third racks could equally comprise arcuate racks which are fixedly connected to a rotatable table around the axis of rotation thereof, with said start and stop positions defining respective working stations around the table. In an arrangement of this kind the load mover preferably comprises the rotatable table itself.

In a linear arrangement it is generally preferable for the load mover to be physically connected to the gear system and drive motor means and for the load mover gear system and drive motor means to move along the racks which are stationary. In a rotary embodiment it will, however, frequently be more convenient for the load mover to be fixedly mounted on the track and to move with the track relative to the gear system and drive motor means. In other words, in a rotary embodiment, the gear system and drive motor means will normally be fixedly mounted, which is particularly favourable since power lines and control lines can be fixedly installed without having to take account of movement of the gear system and drive motor means.

In a particularly preferred linear embodiment said load mover comprises a beam on which said first, second and third racks are provided and in that said first and second output drives are provided on opposite sides of said beam. With this arrangement the load mover is preferably connected to one end of said beam and said payload is supported on a separate motion support system. Moreover, guide means is provided for guiding said beam relative to said first and second output drives and said guide means preferably comprises pairs of rollers disposed on an opposite side of said index drive unit from said payload.

The present invention will now be explained in more detail by way of example only and with reference to the embodiments shown in the accompanying drawings in which FIG. 1 shows three graphs illustrating the performance of a proprietary cam operated index drive, FIG. 2 shows similar graphs for the drive mechanism of the present invention, FIG. 3 shows a simplified sideview of a first embodiment of the drive mechanism of the present invention, FIG. 4 shows a view in the direction IV—IV of the embodiment of FIG. 3, FIG. 5 shows a view similar to FIG. 3 but of a modified embodiment, FIG. 5A shows a view similar to FIG. 5.

FIG. 6 shows a view in the direction VI—VI of the embodiment of FIG. 5,

To understand the present invention it is necessary to first understand how proprietary cam operated index drives function. Such proprietary cam operated index drives are available from companies such as the Camco or Ferguson Corporations in the United States of America, or the Manifold company in Great Britain. These known cam operated index drives, which will hereinafter be referred to simply as "index drives" have an input shaft which is powered by a constant velocity input source, such as an AC or DC motor or a hydraulic motor, and an output shaft which is able, smoothly, energy efficiently and with controlled dynamic forces, to accelerate a heavy load relatively quickly.

Commercial index drives achieve this aim by means of a mathematically ideal profile cut into a circular plate or into a cylinder. This profile consists of dwell, acceleration and deceleration portions and can include a restricted constant velocity portion.

Dwell means that while the input rotates the output shaft is at rest (dwells). All mass moments of inertia have been absorbed in the flywheel energy of the motor. The large output payload is at rest. It is during this period that it is possible to stop the motor and reverse it without effecting the payload.

Acceleration is the period when the output, with its connected payload, begins to move up to a predetermined maximum speed. The required energy is drawn from the flywheel energy stored in the constant running input, plus the electromagnetic energy of the motor. The motor could also be an air motor or a hydraulic motor. It is to be expected that the input slows down somewhat during this period.

Deceleration is the period when the payload slows down and comes to a precise stop. It is to be expected that the input speeds up somewhat due to absorbing the deceleration energy.

It is also possible to cut a constant velocity portion into the cam. During this time the ouput rotates at a certain speed in precise gear ratio to the constant input. The problem is that a cam is only of a certain size for cost and technical reasons. It is not possible to lengthen the constant velocity portion much over 90% of input out of 360°.

Figure 1:
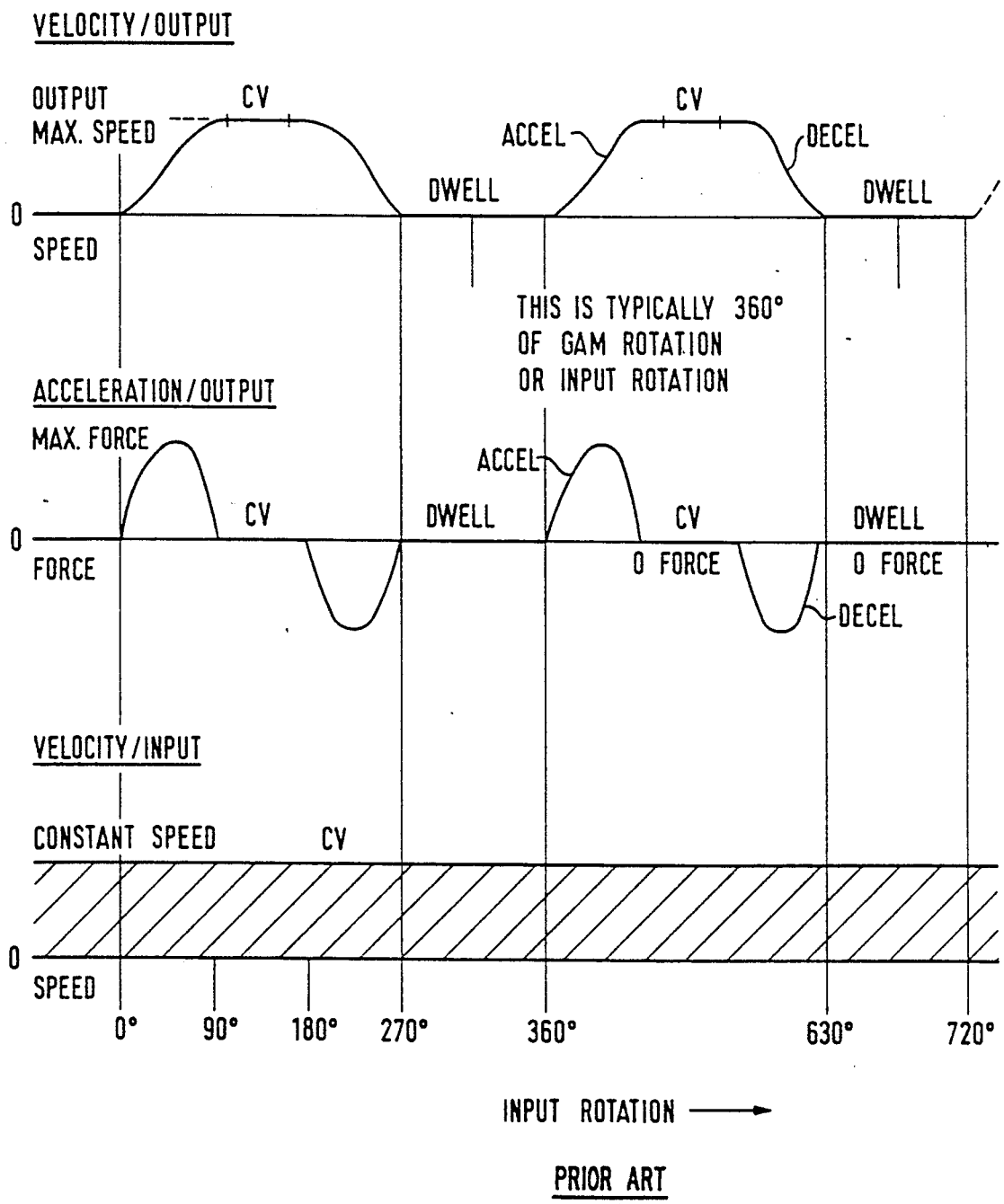

The typical sequence of events in a proprietary cam operated index drive is shown in FIG. 1.

The lowermost graph shows the input to the drive mechanism rotating at constant velocity (CW). At the time prior to 0° of input rotation the index drive is in the dwell state only the input is moving. At 0° the output shaft starts to rotate and accelerates as shown in the middle graph. The maximum force or torque available at the output is obtained at the position of maximum acceleration, i.e. at the peak of the first half sine wave to the right of the 0° datum in the middle graph of FIG. 1. The acceleration then starts to reduce, while still being positive and has reduced to a minimum value at approximately 90° of input rotation. At this time the velocity (angular velocity, peripheral velocity) of the output shaft is at a maximum as shown in the topmost graph of FIG. 1. Then follows a period of constant velocity (V) which lasts from 90° of input shaft rotation to 180° of input shaft rotation when a deceleration phase starts to take place which is completed at 270° of input shaft rotation. It will be noted that between 90° and 180° of input shaft rotation the output rotates at constant velocity and that the sinusoidal deceleration phase has reduced the output shaft to zero velocity at 270° of input shaft rotation. Thereafter there follows a dwell period up to 360° of input shaft rotation when the cycle repeats. A further dwell period then commences after a further 270° of input shaft rotation at 630° of input shaft rotation, and so on.

In order to move a large mass a long way we would like to have 60° to 90° of dwell to start or stop the input, 150° to 135° of acceleration to get the mass moving, 150° to 135° of deceleration to stop the mass and 0° to ∞° amount of constant velocity. That cannot be done with a cam and and it is the solving of this problem that lies at the heart of the present teaching.

For a commercial index drive the output motion as a portion of input rotation can be as long as 300° and is short as 60°. The reason for this is that an index drive often is running continuously, and the customer wishes to maximise dwell time as a percentage of the total time. However, he pays for it with more expensive large cams, since the payload is now accelerated in fewer degrees of cam rotation.

This is one of the great advantages of the present invention in that a relatively small cam can be used to get the mass moving in about 150°, and the required displacement is performed by the output shaft (CV).

If one tried to build a cam with short acceleration and a very long constant velocity to move a big mass it would probably cost over $100.000,--. The equipment proposed here should however cost under $20.000,-- for the same performance.

As indicated in the introduction to the specification the present invention uses separate acceleration and constant velocity racks to prolong the constant velocity portion, with the input drive shaft from the motor engaging the constant velocity rack via a suitable gear during the constant velocity portion.

It should be realised that the torque (acceleration) is 0 during the constant velocity portion of the cycle. This is very important. Only during the constant velocity portion is it possible to change from the acceleration gear rack to the constant velocity gear rack. Both gears will be engaged for a few inches before one gear rack is cut-off. Normally the index drive industry does not use CV or tries to match CV output to CV input. The idea of this invention is to use this feature by equalisation CV OUT to CV IN by means of gears (or rollers, pulleys) and to use the constant running input to get unlimited displacement (stroke). Therefore, since the output is connected to the input the device is reliable. It will be noted that stopping, starting, changing gears etc. is not advisable during the acceleration or deceleration periods.

The typical sequence of events in a drive mechanism in accordance with the present invention is shown in FIG. 2 which again shows three graphs corresponding to the graphs of FIG. 1 but now illustrating the performance of the drive mechanism of the invention. The sequence of events is as follows:

Start The motor or clutch brake starts and gets the input up to CV. The output and therefore the payload do not move.

Point (1) Input CV has been achieved before output moves.

Point 0° Output accelerates.

Point (3) Output is in CV portion. Both CV gear and gear rack and acceleration gear and gear rack are engaged simultaneously for several inches. Acceleration gear rack is cut after this point.

Point (4) Output is still in CV. Both CV gear and rack together with deceleration gear and rack are engaged. CV rack is cut at this time.

Point (2) Output has come to a precise stop. No output load is on input drive. The input can be stopped easily.

Stop The input is stopped at an approximate point. The input motor will be reversed for the next motion (Note: This is for shuttles. Index tables or conveyors can continue.)

Figure 2:
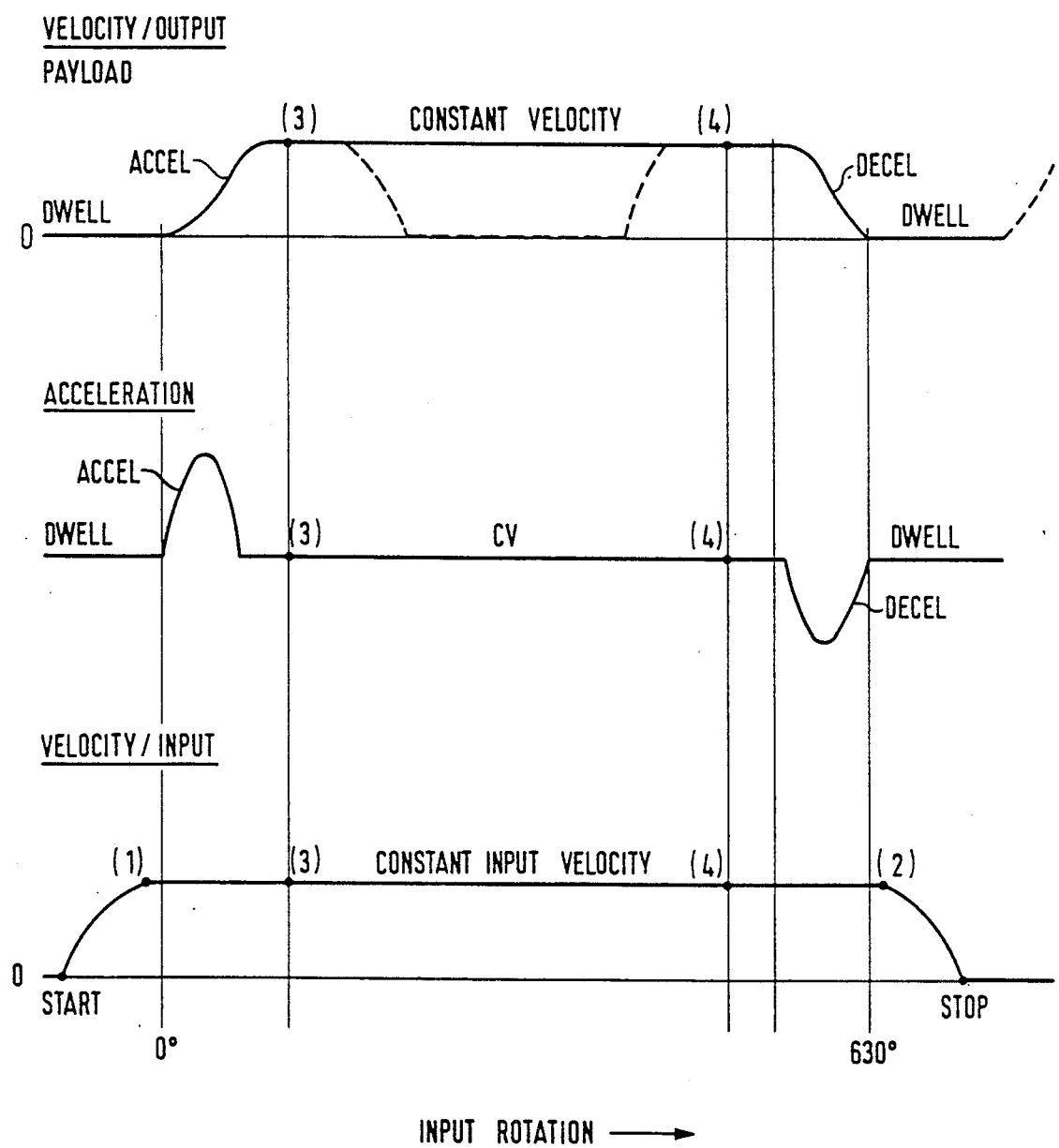

It should be emphasised that the performance characteristics of FIG. 2 cannot be realised by a conventional index drive unit on its own but achieved by incorporating the conventional index drive unit into a special conveyor apparatus in accordance with the present invention. How this is done will now be explained in more detail with reference to the further drawings.

Figure 3:
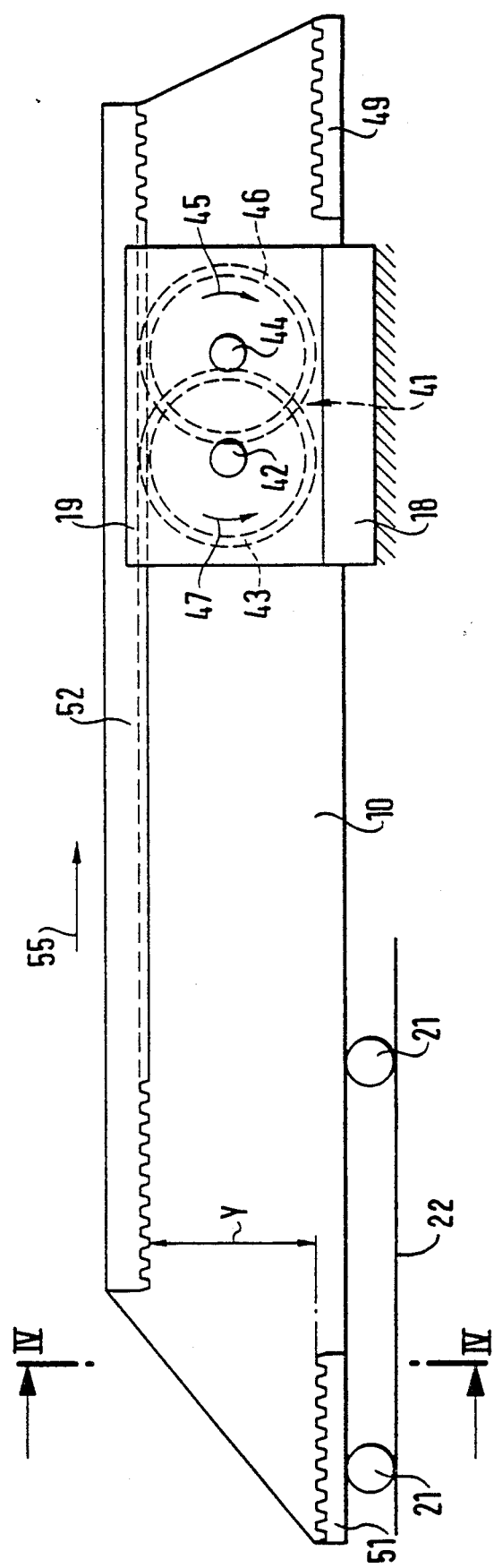
Figure 4:
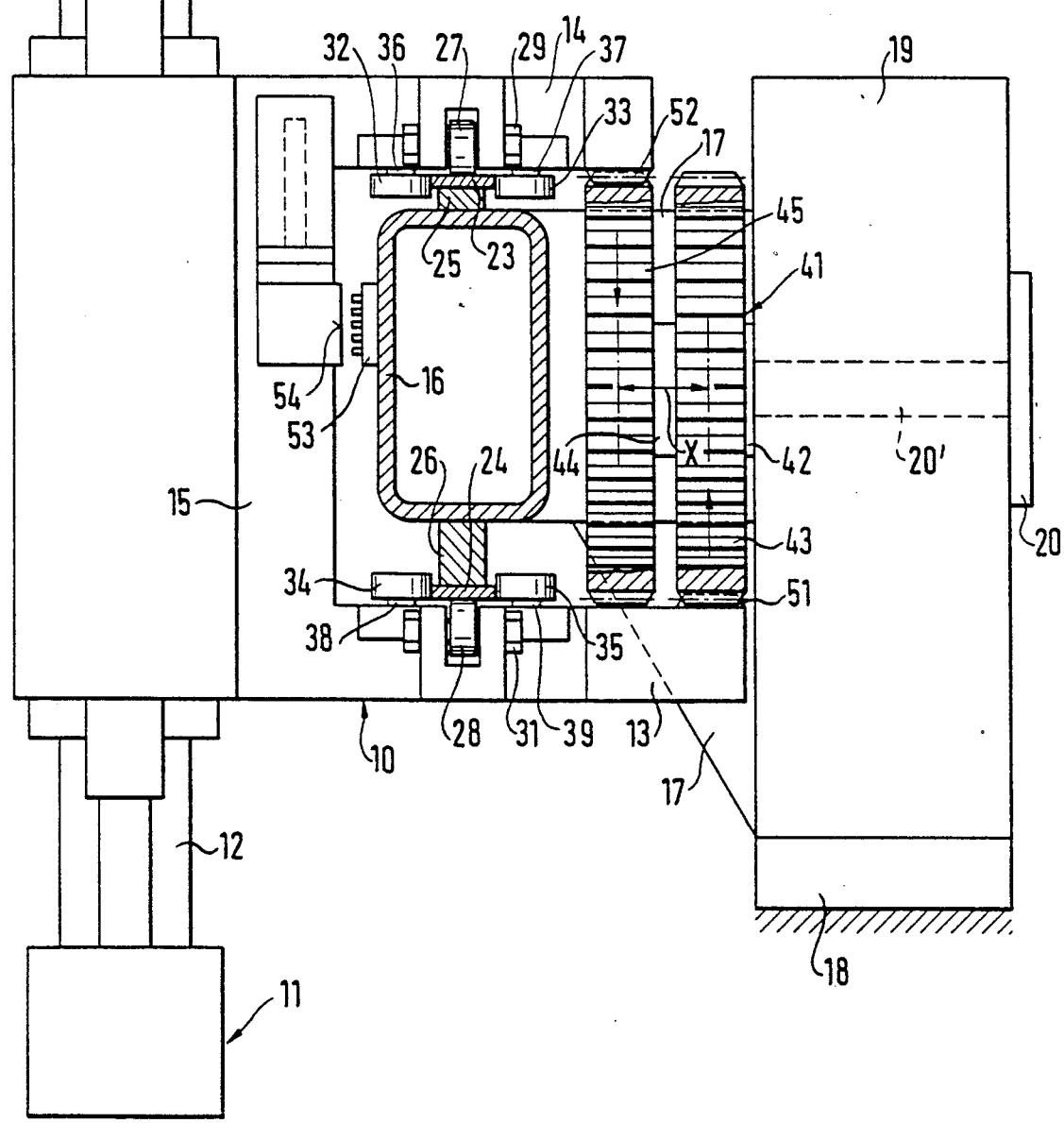

FIGS. 3 and 4 show a first embodiment of a linear shuttle apparatus incorporating a drive mechanism in accordance with the present invention. The shuttle apparatus comprises a load mover 10 for moving a payload 11. The load 11 is suspended from the load mover 10 on a vertically movable slide arrangement 12 which makes it possible to pick up the load 11 at a start position and to deposit it again at a stop position of the shuttle. In this embodiment the load mover 10 has the form of an elongate C-shaped rail with two horizontal limbs 13 and 14 and a vertical limb 15 which provides the support for the vertically movable slide 12. The two limbs 13 and 14 straddle an elongate beam 16 of hollow rectangular cross-section which is supported by sheet metal webs 17, which connect it to a commercially available index drive unit 19 having a drive motor 20 connected to it by an input shaft 20' shown in broken lines in FIG. 3. The index drive unit has the performance characteristics shown in FIG. 1 and is mounted on a foundation 18. The load mover is adapted for movement to the left and to the right in the plane of the drawing of FIG. 3 and perpendicular to the plane of the drawing of FIG. 4. It is supported for this movement by the rectangular carrier beam 16 which is only shown in FIG. 4. Additional supports in the form of rollers 21 which engage beneath the elongate load mover and run on a guide rail or similar track 22 can be provided to prevent excessive cantilever loads when the center of gravity of the load mover is spaced substantially from the support for the carrier beam 16. Alternatively the carrier beam 16 can be extended out beyond the extreme left and right hand positions of the load mover and can be supported there by further supports (not shown).

In either case the carrier beam 16 serves to ensure accurate guidance of the load mover relative to the index drive 19. For this purpose it has upper and lower rails 23, 24 of rectangular cross-section which extend in the longitudinal direction of the carrier beam and are supported on the carrier beam 16 by respective support pillars or webs 25, 26. The elongate load mover has a plurality of rollers which engage with these rectangular cross-section rails 23, 24. More specifically the C-section load mover has an upper roller 27, which bears on the upper surface of the rectangular rail 23, and a lower roller 28, which bears on the lower surface of the lower rail 24. The rollers 27 and 28 are supported on respective pivot bolts 29 and 31.

Further pairs of rollers 32, 33 and 34, 35 engage on respective opposite sides of each of the rectangular section rails 23 and 24, the rollers 32 to 35 being supported on respective pivot axles 36, 37, 38 and 39. Only one set of rollers 27, 28, 32, 33, 34 and 35 is shown in FIG. 4, however, several sets are in fact provided at intervals along the elongate load mover. These rollers cooperate with the rails 23, 24 to ensure that the load mover is properly supported and guided for the movement relative to the index drive 19.

The actual movement of the load mover is brought about by a gear system indicated generally by the reference numeral 41 which is driven by the index drive in the manner which will now be explained in more detail. The normal output drive shaft 42 of the index drive unit carries an output drive gear 43 of larger diameter.

The input drive shaft 20' is extended through the index drive unit to form an extension shaft 44 which carries a second output drive gear 45. This second output drive gear 45 is located axially behind the first output drive gear 43 and partially overlaps it. The axial spacing between the first and second output drive gears 43 and 45 is designated by the distance X. The extension shaft 44 forms a second transmission.

On rotation of the input drive shaft 20' the first output drive gear 43 will rotate in the anti-clockwise direction shown by the arrow 47 in FIG. 3, while the second output drive gear 45 will rotate in the clockwise direction shown by the arrow 46 in FIG. 3.

The lower limb 13 of the C-section load mover 10 carries a first rack 49 which is capable of meshing with the first output drive gear 43 and a third rack 51 which is likewise capable of meshing with the first output drive gear 43. As seen in FIG. 3 the first rack 49 and the third rack 51 are arranged at opposite ends of the C-shaped load mover. The upper limb 14 of the C-shaped load mover carries a second rack 52 which is capable of meshing with the second output drive gear 45. The second rack 52 is spaced both horizontally and vertically from the first and third racks 49 and 51. The horizontal spacing of the second rack 52 from each of the first and third racks 49 and 51 is the same distance X as the axial spacing of the first and second output drive gears 43 and 45. The vertical spacing Y between the second track 52 and the first and third racks 49 and 51 corresponds substantially to the diameter of the first and second output drive gears 43, 45. Finally, FIG. 3 shows an arrangement of microswitches, proximity switches or the like 53 which are fixed to the carrier beam 16 and cooperate with counterelements 54 on the carrier rail 10 to initiate cycle stop and start signals for the index drive as the load mover 10 moves relative to the index drive 19.

An operating cycle of the embodiment of FIGS. 3 and 4 will now be described. For purposes of the following discussion it must be assumed that the C-shaped carrier is positioned to the right of the position shown in FIG. 3 so that the teeth of the first output drive gear 43 mesh with the gear teeth of the first rack 49 at the extreme right hand end thereof. The input drive motor 20 to the index drive 19 is running at constant velocity. The output shaft 42 of the index drive is however stationary. At a time corresponding to the 0° position in FIG. 2 a cycle demand signal is applied to the index drive unit and the output drive shaft 42 starts to accelerate. As it does so, it accelerates the first output drive gear 43 which accelerates the C-shaped load mover 10 and the load 11 so that the C-shaped carrier 10 moves and accelerates to the right in the drawing of FIG. 3 as illustrated by the arrow 55.

When the acceleration phase is complete, the second output drive gear 45 engages with the second rack 52 and, after engagement is complete, the first output drive gear 43 disengages from the first rack 49. The second output drive gear 45 now propels the load mover at constant velocity further to the right in the direction of the arrow 55.

On reaching the extreme left hand end of the second rack 52 the deceleration phase shown in FIG. 2 starts automatically. This is achieved simply by the fact that the length of the constant velocity rack 52 is chosen, having regard to the known angular relationship between the input and output drive shafts 20', 42 and the size of the gears 43, 45, so that the first output drive gear is engaged with the third rack when the output shaft 42 is about to start a decelerating cycle, i.e. at a time corresponding (in the example) to 180° of input shaft rotation in FIGS. 1 or 2 (more correctly 360n +180° of input shaft rotation where n is any integer including 0, since the input shaft can complete an integer number of rotations while the second output drive gear 45 is engaged with the CV rack 52.

This deceleration cycle can be initiated either by allowing the output shaft 42 to continue executing sinusoidal acceleration and deceleration movements during engagement of the second output drive gear with the constant velocity rack 52 or by initiating a new demand cycle at a time prior to the first output drive gear 43 reaching the third rack 51, so that it is engaged with the same at a time corresponding to the start of the deceleration phase. This new cycle can be initiated by means of a suitably positioned microswitch and a cooperating counterelement. During the deceleration phase the first output drive gear 43 engages with the third rack 51 and produces deceleration of the load mover so that it has stopped completely in the stop position once the first output drive gear 43 has reached the extreme left hand end of the third rack 51.

It will be noted that at times at which both output drive gears 43 or 45 are engaged with the racks the gears are moving at constant velocity, there is therefore never a situation when the two gears "fight" one another.

Moreover, it will be noted that the relative angular positions of the first output drive gear 43 and of the second output drive gear 45 are uniquely related to one another through the index drive unit 19. Consequently it is possible to accurately position the racks 49, 51 and 52 relative to one another.

In order to return the load mover with the attached load from the extreme right hand position to the extreme left hand position it is only necessary to reverse the direction of rotation of the index drive input and the procedure described above is repeated with the third rack 51 adopting the role of the first rack and with the first rack 49 adopting the role of the third rack 51.

Although the embodiment of FIGS. 3 and 4 may be suitable for some applications it is little cumbersome in as much as the load mover takes the form of a very long elongate structure all of which has to be accelerated to the right and to the left. For this reason an embodiment is preferred as shown in FIGS. 5 and 6. This embodiment is similar in many respects to the embodiment of FIGS. 3 and 4 and parts having the same function have been identified by the same reference numerals and will not be described again in detail.

The important point to note about the embodiment of FIGS. 5 and 6 is that the index drive unit and the C-shaped load mover have been combined into a yoke which surrounds the beam 16. Moreover, the racks 49, 51 and 52 are now no longer positioned on the load mover but are instead positioned on respective horizontally extending flanges 61 and 62 of the carrier beam 16. The carrier beam 16 is supported at its two extreme ends (supports not shown), and the load mover together with the gear system and the index drive unit are able to move to the left and to the right along the carrier beam 16 between these two ends which define the start and stop positions. Clearly for movement in the opposite direction the start and stop positions are interchanged. Since the load mover no longer has to support the racks 49, 51 and 52 it can be kept relatively narrow as seen in the longitudinal direction of the carrier beam 15.

The operation of the embodiment of FIGS. 5 and 6 is precisely the same as was described with reference to the embodiment of FIGS. 3 and 4 and will not be described again in further detail.

It should however be noted that the embodiment of FIGS. 5 and 6 lends itself to an arrangement in which the load mover stops and starts at a plurality of stations along the carrier beam 15. For this purpose it is merely necessary to place first and third racks in contact with one another at each of the stop and start positions and to extend the carrier beam. There is a slight limitation here since, with an index drive as the motor drive means, stopping is possible only as a multitude of rotations of the first output drive gear. However, the benefits of such an inexpensive, dynamic, superior mechanical mechanism are considerable for the right application.

Figure 7:
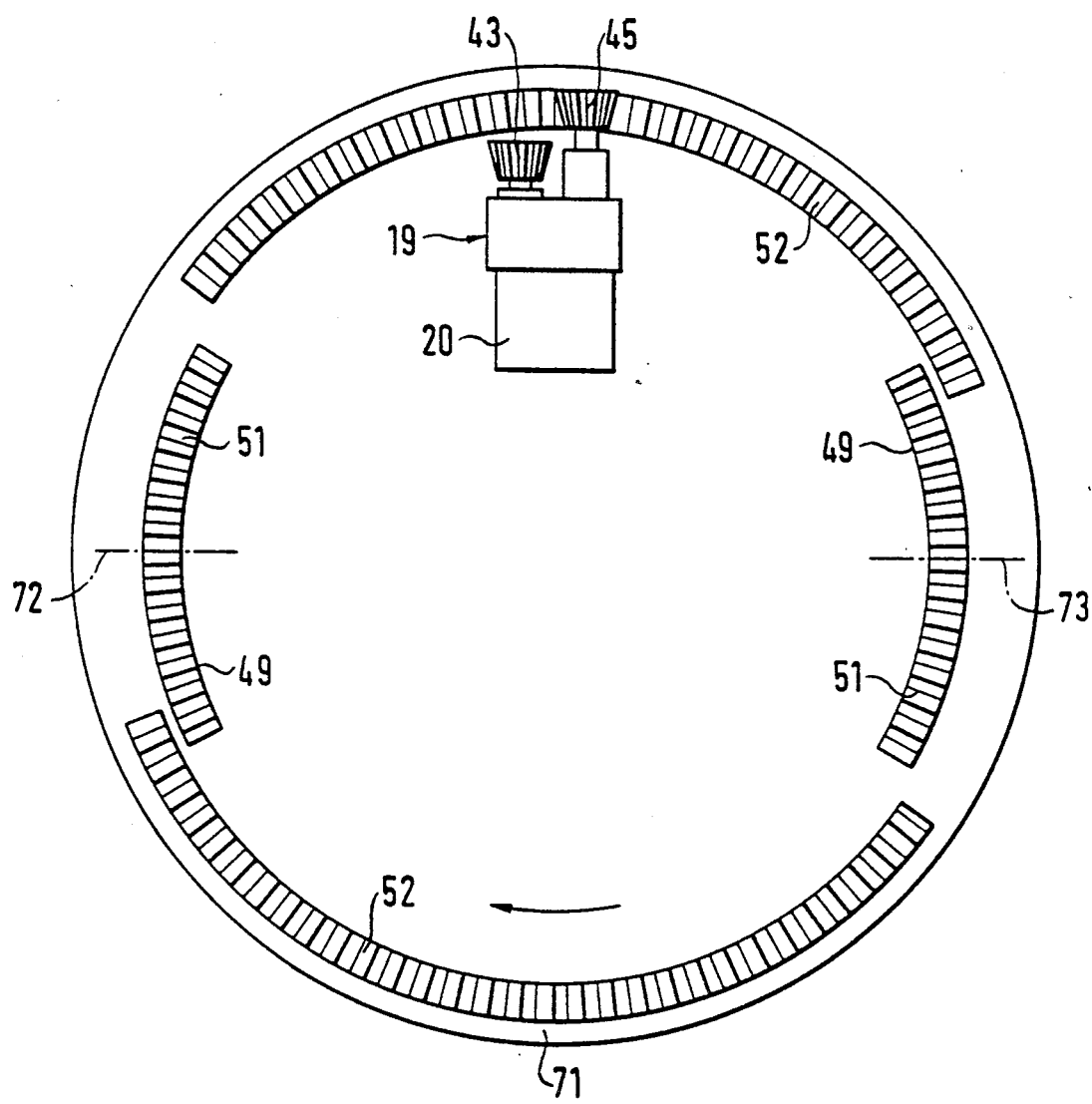
FIG. 7 shows a view of the underside of a further alternative embodiment of the drive mechanism of the present invention.

FIG. 7 illustrates a rotary embodiment of the drive mechanism of the present invention.

In the embodiment of FIG. 7 the load mover takes the form of a rotary table 71 which can be seen from below in FIG. 7. The rotary table is rotatable in two 180° steps between two working stations 72 and 73. By way of example workpieces (not shown) can be loaded onto the table at 72, can be transported on the table to a working station 73, and can be worked on in this station. Thereafter they can be passed on further to the station 72 where they are removed again from the table, while a new workpiece previously supplied at the station 72 is transported into the working station 73.

In order to produce rotation of the table arcuate gear racks are secured to the underside of the table 71. Starting at the 9,00° clock position in FIG. 7 these racks comprise in anticlockwise direction a first rack 49, a second rack 52, a third rack 51, a further first rack 49 directly adjoining the third rack 51, a further second rack 52 and a further third rack 51 directly adjoining the first mentioned first rack 49.

The racks can either be arranged vertically spaced apart and facing in opposite directions as in the embodiments of FIGS. 3 to 6 or can be arranged in the same plane as illustrated in FIG. 7, providing a further intermediate gear is added to the second transmission as previously described to ensure that the first output drive gear and the second output drive gear rotate in the same directions. In the embodiment of FIG. 7, the first and second output drive gears 43 and 45 are mounted on an index drive unit 19 with an associated drive motor 20. The entire unit formed by the output drive gears 43, 45, the index drive unit 19 and the drive motor 20 remains stationary.

As the racks are of arcuate shape in this embodiment, the first and second output gears 43 and 45 have to be formed as bevel gears and the arcuate racks 49, 51 and 52 have to be bevelled and shaped accordingly.

The operation of the embodiment of FIG. 7 is substantially the same as for the embodiment of FIGS. 3 and 4. I.e. on applying a demand signal to the input drive unit 19 the rotary table with the load mounted thereon is accelerated by engagement of the first output drive gear 43 with the first rack 49. Once the acceleration phase has been completed the first output drive gear 43 disengages from the first rack 49 while the second output drive gear 45 is engaged with the second rack 52. The table then continues to rotate at constant velocity until the first output drive gear 43 engages the third rack 51 and the second output drive gear 45 leaves the second rack 52. At this point in time the output drive of the index drive unit decelerates so that the rotary table stops at the working station 73. After carrying out the required operation at the working station 73, removal of the machined workpiece at station 72 and placement of a new workpiece on the rotary table at the station 72 a new cycle is demanded and the table is again rotated through 180° This time the first drive gear 43 first cooperates with the further first rack 49 during an acceleration phase, the second output drive gear 45 cooperates with the further second rack 52 during the constant velocity phase and the first output drive gear 43 cooperates with the further third rack 51 in the deceleration phase. Clearly this sequence can be repeated indefinitely.

Figure 8:
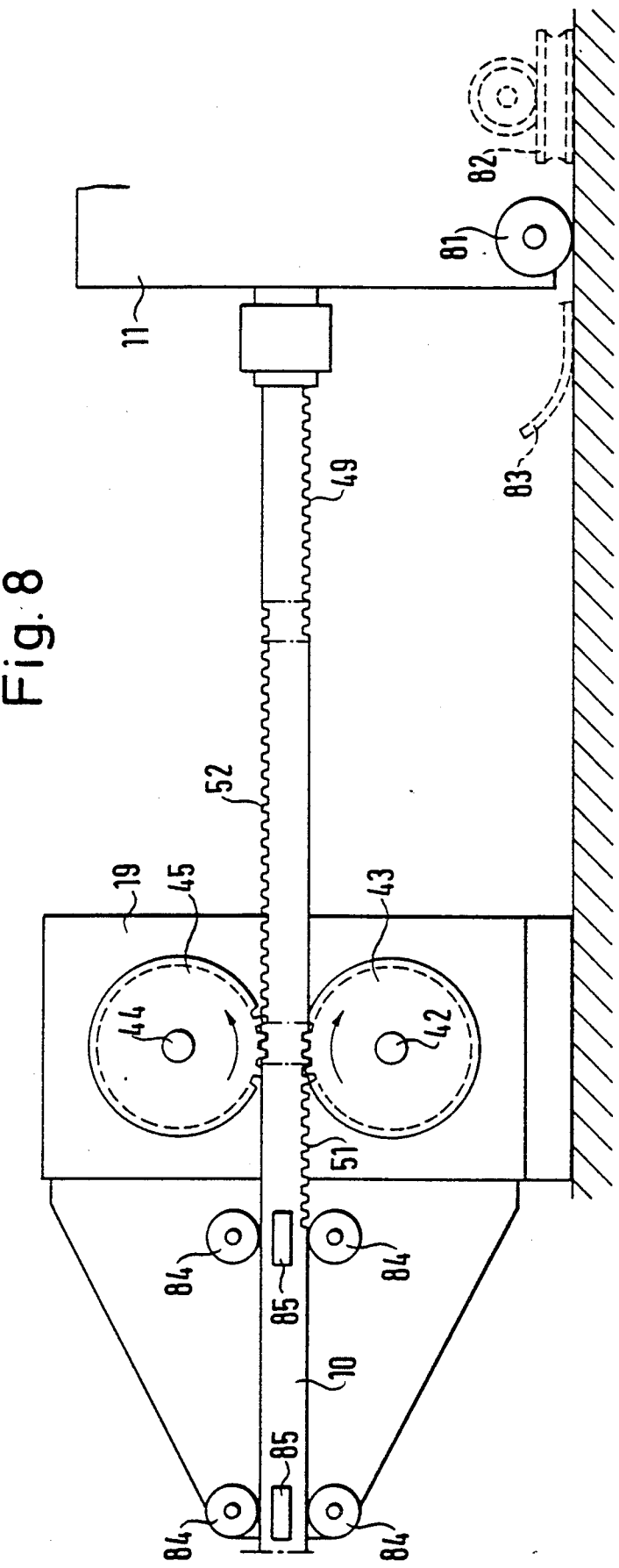
FIG. 8 shows a further simplified embodiment of a drive mechanism in accordance with the present invention.

FIG. 8 shows a further drive mechanism which is similar to the embodiment of FIGS. 3 and 4 but distinguished therefrom in as much as the two output drives 42 and 44 are arranged above one another, above and below a beam 10 which carries the acceleration, deceleration and constant velocity racks and simultaneously forms the load mover. In this case the payload 11 is directly connected to the extreme right hand end of the beam-like load mover 10 and is mounted on rollers or wheels 81 so that it can move along the floor 82. Alternatively the payload 11 could be mounted on rails such as 82 or on a slide such as 83. The rails 82 and slide 83 are only illustrated in broken lines in FIG. 8 in order to indicate that these are alternatives. The beam 10 carrying the racks is guided on the side of the index drive remote from the payload via an arrangement of support rollers 84, 85 which ensure that the carrier beam is always maintained in alignment with the drive gears 43, 45.

Figure 8A:
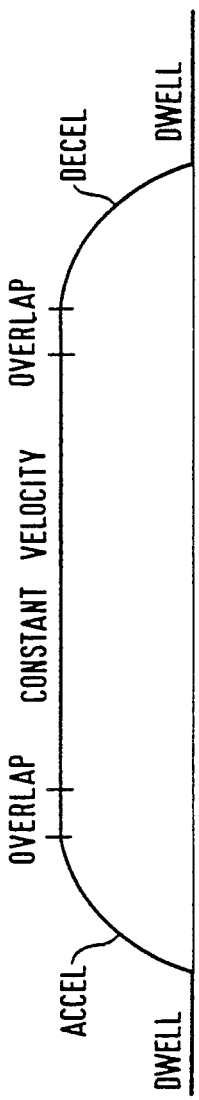
FIG. 8A is a graph showing the different phases of movement of the drive mechanism of FIG. 8.

The graph of FIG. 8a shows the dwell acceleration, overlap, constant velocity, overlap, deceleration and dwell phases of the movement of the payload of FIG. 8 in relation to the position of the racks.

I claim:

1. A drive mechanism comprising:
a load mover for connection to a payload for moving the same;
elongate track means extending in a direction in which said load mover is movable;
a drive motor for driving said load mover and a gear system connectable to said drive motor;
wherein said load mover is fixedly connected to one of said gear system and said track means for movement between a start position and a stop position;
wherein said elongate track means comprises first and second tracks extending in series in said direction;
wherein said gear system comprises first rotatable output drive engageable with said first track and connected in operation to said drive motor via an index drive unit forming a first transmission, and a second rotatable output drive engageable with said second track and connected in operation with said drive motor via a second transmission;
wherein said first track is positioned relative to said second track so that when said first output drive leaves said first track said second output drive is engaged with said second track, wherein said first output drive has, on leaving said first track, a peripheral speed at least substantially equal to the peripheral speed of said second output drive engaged with said second track, and wherein a velocity of said load mover when said first output drive leaves said first track is non-zero and substantially equal to a velocity of said load mover when said second output drive engages said second track.

2. A drive mechanism in accordance with claim 1, wherein said track means comprises linear track means and wherein said load mover is connected to said gear system and is movable therewith along said track means, said track means remaining stationary.

3. A drive mechanism in accordance with claim 1, wherein said first track comprises a first rack and wherein said first output drive comprises a first output drive gear capable of meshing with said first rack.

4. A drive mechanism in accordance with claim 3, wherein said second track comprises a second rack and said second output drive comprises a second output drive gear capable of meshing with said second rack.

5. A drive mechanism in accordance with claim 4, wherein a third rack constructed in accordance with said first rack is provided at an end of said second rack remote from said first rack and is engageable by said first output drive during stopping of said load mover, and wherein said third rack is positioned relative to said second rack so that it is engaged by said first output drive gear when said second output drive gear leaves said second rack.

6. A drive mechanism in accordance with claim 5, wherein said first, second and third racks comprises arcuate racks fixedly connected to a rotatable table around the axis of rotation thereof, with said start and stop positions defining respective working stations around said table.

7. A drive mechanism in accordance with claim 6, wherein said load mover comprises said rotatable table.

8. A drive mechanism in accordance with claim 6, wherein said gear system is fixedly mounted.

9. A drive mechanism in accordance with claim 5, wherein said load mover comprises a beam on which said first, second and third racks are provided and in that said first and second output drives are provided on opposite sides of said beam.

10. A drive mechanism in accordance with claim 9, wherein said load mover is connected to one end of said beam and said payload is supported on a separate motion support system.

11. A drive mechanism in accordance with claim 10, wherein guide means is provided for guiding said beam relative to said first and second output drives.

12. A drive mechanism in accordance with claim 11, wherein said guide means comprises pairs of rollers disposed on an opposite side of said index drive unit from said payload.

13. A drive mechanism comprising:
a load mover for connection to a payload for moving the same;
elongate track means extending in a direction in which said load mover is movable;
a drive motor for driving said load mover and a gear system connectable to said drive motor;
wherein said load mover is fixedly connected to one of said gear system and said track means for movement between a start position and a stop position;
wherein said elongate track means comprises first and second tracks extending in series in said direction;
wherein said gear system comprises a first rotatable output drive engageable with said first track and connected in operation to said drive motor via an index drive unit forming a first transmission, and a second rotatable output drive engageable with said second track and connected in operation with said drive motor via a second transmission;
wherein said first track is positioned relative to said second track so that when said first output drive leaves said first track said second output drive is engaged with said second track, wherein said first output drive has, on leaving said first track, a peripheral speed at least substantially equal to the peripheral speed of said second output drive engaged with said second track, and wherein a velocity of said load mover when said first output drive leaves said first track is non-zero and substantially equal to a velocity of said load mover when said second output drive engages said second track;
wherein said first track comprises a first rack and wherein said first output drive comprises a first output drive gear capable of meshing with said first rack;
wherein said second track comprises a second rack and said second output drive comprises a second drive gear capable of meshing with said second rack;
wherein a third rack constructed in accordance with said first rack is provided at an end of said second track remote from said first rack and is engageable by said first output drive during stopping of said load mover, and wherein said third rack is positioned relative to said second rack so that it is engaged with said first output drive gear when said second output drive gear leaves said second rack; and
wherein said third rack is followed by further first, second and third racks defining at least one further start position coincident with said stop position and a further stop position spaced from said further start position.

14. A drive mechanism in accordance with claim 13, wherein said index drive and said first, second and third racks are arranged to produce acceleration of said load mover on said first rack, constant velocity of said load mover on said second rack and deceleration of said load mover on said third rack.

15. A drive mechanism comprising:
a load mover for connection to a payload for moving the same;
elongate track means extending in a direction in which said load mover is movable;
a drive motor for driving said load mover and a gear system connectable to said drive motor;
wherein said load mover is fixedly connected to one of said gear system and said track means for movement between a start position and a stop position;
wherein said elongate track means comprises first and second tracks extending in series in said direction;
wherein said gear system comprises a first rotatable output drive engageable with said first track and connected in operation to said drive motor via an index drive unit forming a first transmission, and a second rotatable output drive engageable with said second track and connected in operation with said drive motor via a second transmission;
wherein said first track is positioned relative to said second track so that when said first output drive leaves said first track said second output drive is engaged with said second track, wherein said first output drive has, on leaving said first track, a peripheral speed at least substantially equal to the peripheral speed of said second output drive engaged with said second track, and wherein a velocity of said load mover when said first drive leaves said first track is non-zero and substantially equal to a velocity of said load mover when said second drive engages said second track;

wherein said first track comprises a first rack and wherein said first output drive comprises a first output drive gear capable of meshing with said first rack;

wherein said second track comprises a second rack and said second output drive comprises a second output drive gear capable of meshing with said second rack; and wherein said second rack extends parallel to said first rack and is spaced therefrom by a vertical spacing and by a horizontal spacing, wherein said index drive unit has an input drive shaft which connects said drive motor to said index drive unit and wherein said second transmission comprises an extension of the input drive shaft.

16. A drive mechanism in accordance with claim 15, wherein said first and second output drive gears have a diameter corresponding substantially to said vertical spacing.

* * * * *